(12) United States Patent
Yang

(10) Patent No.: US 8,576,709 B2
(45) Date of Patent: Nov. 5, 2013

(54) SYSTEM AND METHOD FOR MONITORING DROPPED PACKETS

(75) Inventor: Yunsong Yang, Schaumburg, IL (US)

(73) Assignee: FutureWei Technologies, Inc., Plano, TX (US)

( * ) Notice: Subject to any disclaimer, the term of this patent is extended or adjusted under 35 U.S.C. 154(b) by 207 days.

(21) Appl. No.: 13/115,676

(22) Filed: May 25, 2011

(65) Prior Publication Data

US 2012/0300648 A1 Nov. 29, 2012

(51) Int. Cl.
*H04L 12/26* (2006.01)
*G06F 15/16* (2006.01)
*G06F 11/07* (2006.01)

(52) U.S. Cl.
USPC ........... 370/230; 370/235; 370/394; 370/469; 709/232; 709/224

(58) Field of Classification Search
USPC ........... 370/230, 235, 394, 469; 709/232, 224
See application file for complete search history.

(56) References Cited

U.S. PATENT DOCUMENTS

| | | | |
|---|---|---|---|
| 6,389,031 B1 * | 5/2002 | Chao et al. ................. | 370/412 |
| 6,845,105 B1 * | 1/2005 | Olsson et al. ............... | 370/469 |
| 2006/0168241 A1 * | 7/2006 | Puthiyandyil et al. ....... | 709/227 |
| 2006/0187955 A1 * | 8/2006 | Rezaiifar et al. ............ | 370/464 |
| 2009/0046608 A1 * | 2/2009 | Jiang ........................... | 370/310 |
| 2010/0110958 A1 * | 5/2010 | Racz et al. .................. | 370/312 |
| 2010/0278062 A1 * | 11/2010 | Abraham et al. ............ | 370/252 |
| 2011/0119761 A1 * | 5/2011 | Wang et al. ................. | 726/23 |
| 2012/0099525 A1 * | 4/2012 | Maheshwari ................ | 370/328 |

FOREIGN PATENT DOCUMENTS

| | | |
|---|---|---|
| CN | 101483505 A | 7/2009 |
| CN | 101529759 A | 9/2009 |
| JP | 2002261868 A | 9/2002 |

OTHER PUBLICATIONS

"3rd Generation Partnership Project; Technical Specification Group Services and System Aspects; Telecommunication management; Peformance Management (PM); Performance measurements Evolved Universal Terrestrial Radio Access Network (E-URANn) (Release 10)," 3GPP TS 32.425, V10.3.0, Dec. 2010, 53 pages.
"3rd Generation Partnership Project; Technical Specification Group Radio Access Network; Evolved Universal Terrestrial Radio Access (E-UTRA); Layer 2—Measurements (Release 10)," 3GPP TS 36.314, V10.0.0, Dec. 2010, 17 pages.
"3rd Generation Partnership Project; Technical Specification Group Radio Access Network; Evolved Universal Terrestrial Radio Access (E-UTRA); Radio Link Control (RLC) protocol specification (Release 10)," 3GPP TS 36.322, V10.0.0, Dec. 2010, 39 pages.
PCT Search Report and Written Opinion of Application No. PCT/CN2012/075704, date of mailing Aug. 23, 2012,10 pages.

\* cited by examiner

*Primary Examiner* — Alpus H Hsu
*Assistant Examiner* — Walter Divito
(74) *Attorney, Agent, or Firm* — Slater & Matsil, L.L.P.

(57) ABSTRACT

A system and method for monitoring dropped packets are provided. A method for communications device operations includes receiving a sequence of packets from a transmitting station, where each packet in the sequence of packets includes a protocol layer packet for each protocol layer of multi-layered network. The method also includes determining if a packet in the sequence of packets has been dropped by the transmitting station, where the determining is based on at least two sets of sequence numbers associated with different protocol layers of packets in the sequence of packets. The method further includes updating a packet discard counter based on the determining.

34 Claims, 10 Drawing Sheets

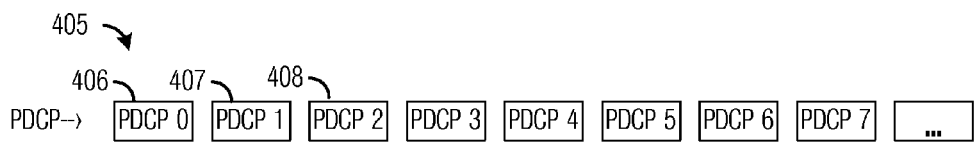
*Fig. 4a*
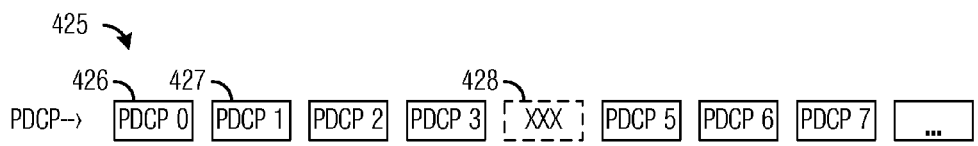
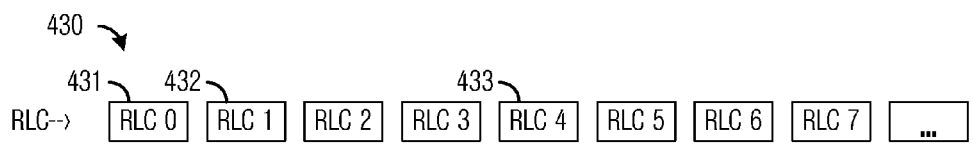
*Fig. 4b*
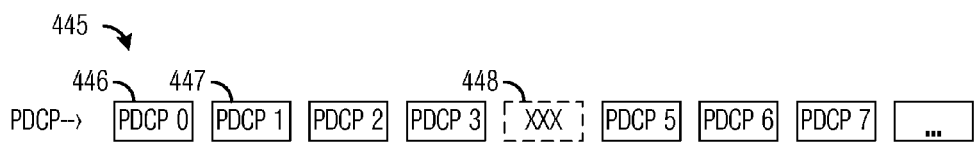
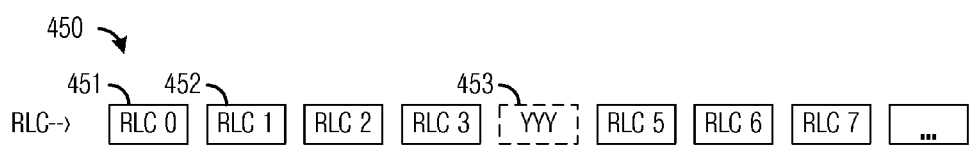
*Fig. 4c*

800

| | | | | | | |
|---|---|---|---|---|---|---|
| VERSION | PT | (*) | E | S | PN | OCTET 1 |
| MESSAGE TYPE ||||||  OCTET 2 |
| LENGTH (FIRST OCTET) ||||||  OCTET 3 |
| LENGTH (SECOND OCTET) ||||||  OCTET 4 |
| TUNNEL ENDPOINT IDENTIFIER (FIRST OCTET) ||||||  OCTET 5 |
| TUNNEL ENDPOINT IDENTIFIER (SECOND OCTET) ||||||  OCTET 6 |
| TUNNEL ENDPOINT IDENTIFIER (THIRD OCTET) ||||||  OCTET 7 |
| TUNNEL ENDPOINT IDENTIFIER (FOURTH OCTET) ||||||  OCTET 8 |
| SEQUENCE NUMBER (FIRST OCTET) ||||||  OCTET 9 |
| SEQUENCE NUMBER (SECOND OCTET) ||||||  OCTET 10 |
| N-PDU NUMBER ||||||  OCTET 11 |
| NEXT EXTENSION HEADER TYPE ||||||  OCTET 12 |

*Fig. 8*

SYSTEM AND METHOD FOR MONITORING DROPPED PACKETS

TECHNICAL FIELD

The present invention relates generally to digital communications, and more particularly to a system and method for monitoring dropped packets.

BACKGROUND

A relay node (RN), or relay station (RS), or simply relay, is considered as a tool to improve, e.g., the coverage of a base station, group mobility, temporary network deployment, the cell-edge throughput and/or to provide coverage in new areas. The RN is wirelessly connected to a wireless communications network via a donor cell (also referred to as a donor enhanced Node B (donor eNB or DeNB)) through network resources donated (i.e., allocated) by the DeNB. The DeNB serves the RN as if the RN is a UE.

A wireless connection between an RN and its DeNB may be referred to as a backhaul link or a Un link. To User Equipment (UE) that is being served by the RN, the RN may appear to be an eNB, scheduling uplink (UL) and downlink (DL) transmissions for the UE over an access link between the RN and the UE. The access link between an eNB and a UE, or between an RN and a UE may also be referred to as a Uu link.

In a communications system, when a network node experiences congestion, data packets may be dropped by the congested network node in an attempt to reduce congestion. Furthermore, an end-to-end congestion control mechanism in a transport layer protocol, such as the Tahoe or Reno algorithm in Transmission Control Protocol (TCP), may cause a sender to reduce a source data rate (often significantly) in response to an indication of a lost packet from a recipient to further alleviate congestion.

In a radio access network (RAN), an eNB (also commonly referred to as a base station, Node B, access network, access point, controller, communications controller, and so forth) may drop data packets in the DL when congestion occurs on the DL at the eNB.

However, due to an inherent uncertainty in wireless communications, it may be hard to determine if a packet has been dropped intentionally or lost in transmissions due to poor operating conditions. Therefore, there is a need for a system and method for monitoring dropped packets in wireless communications.

SUMMARY OF THE INVENTION

These and other problems are generally solved or circumvented, and technical advantages are generally achieved, by example embodiments of the present invention which provide a system and method for monitoring dropped packets.

In accordance with an example embodiment of the present invention, a method for communications device operations is provided. The method includes receiving a sequence of packets from a transmitting station, where each packet in the sequence of packets includes a protocol layer packet for each protocol layer of multi-layered network. The method also includes determining if a packet in the sequence of packets has been dropped by the transmitting station, where the determining is based on at least two sets of sequence numbers associated with different protocol layers of packets in the sequence of packets.

In accordance with another example embodiment of the present invention, a method for communications device operations is provided. The method includes determining a first sequence number of a received packet in a sequence of packets, where the first sequence number is associated with a first protocol layer. The method also includes determining if there is a discontinuity in the first sequence number. The method further includes if there is a discontinuity in the first sequence number, determining a second sequence number of the received packet, where the second sequence number is associated with a second protocol layer, and wherein the second protocol layer is lower in a protocol layer structure than the first protocol layer, and determining if there is a corresponding discontinuity in the second sequence number. The method additionally includes if there is the corresponding discontinuity in the second sequence number, determining that a packet in the sequence of packets was lost in transmission, and if there is not the corresponding discontinuity in the second sequence number, determining that the packet in the sequence of packets was dropped by a transmitting station.

In accordance with another example embodiment of the present invention, a communications device is provided. The communications device includes a receiver, and a processing unit coupled to the receiver. The receiver receives a sequence of packets from a transmitting station, where each packet in the sequence of packets comprises a protocol layer packet for each protocol layer of multi-layered network. The processing unit determines if a packet in the sequence of packets has been dropped by the transmitting station, where the processing unit determines that the packet has been dropped based on at least two sets of sequence numbers associated with different protocol layers of packets in the sequence of packets, and counts a number of dropped packets.

One advantage disclosed herein is that it is possible to distinguish between dropped packets and packets lost in transmission. Thereby, appropriate measures may be taken to compensate for the missing packets.

A further advantage of exemplary embodiments is that the system and method presented herein may be capable of determining where (as in which layer) the packets are being dropped, which may assist in diagnosing and fixing the problem causing the dropped packets.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4a, 4b, and 4c illustrate example sequences of PDCP packets and sequences of RLC packets according to example embodiments described herein;

FIG. 8 illustrates an example GTP-U header;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a Third Generation Partnership Project (3GPP) Long Term Evolution (LTE) compliant communications system with RNs. The invention may also be applied, however, to other communications systems, such as those compliant to WiMAX, IEEE 802.16, 3GPP LTE-Advanced, and so forth, technical standards, as well other communications systems with RNs, or peer-to-peer communications systems, ad-hoc networks, mesh networks, and so forth.

Figure 1A:
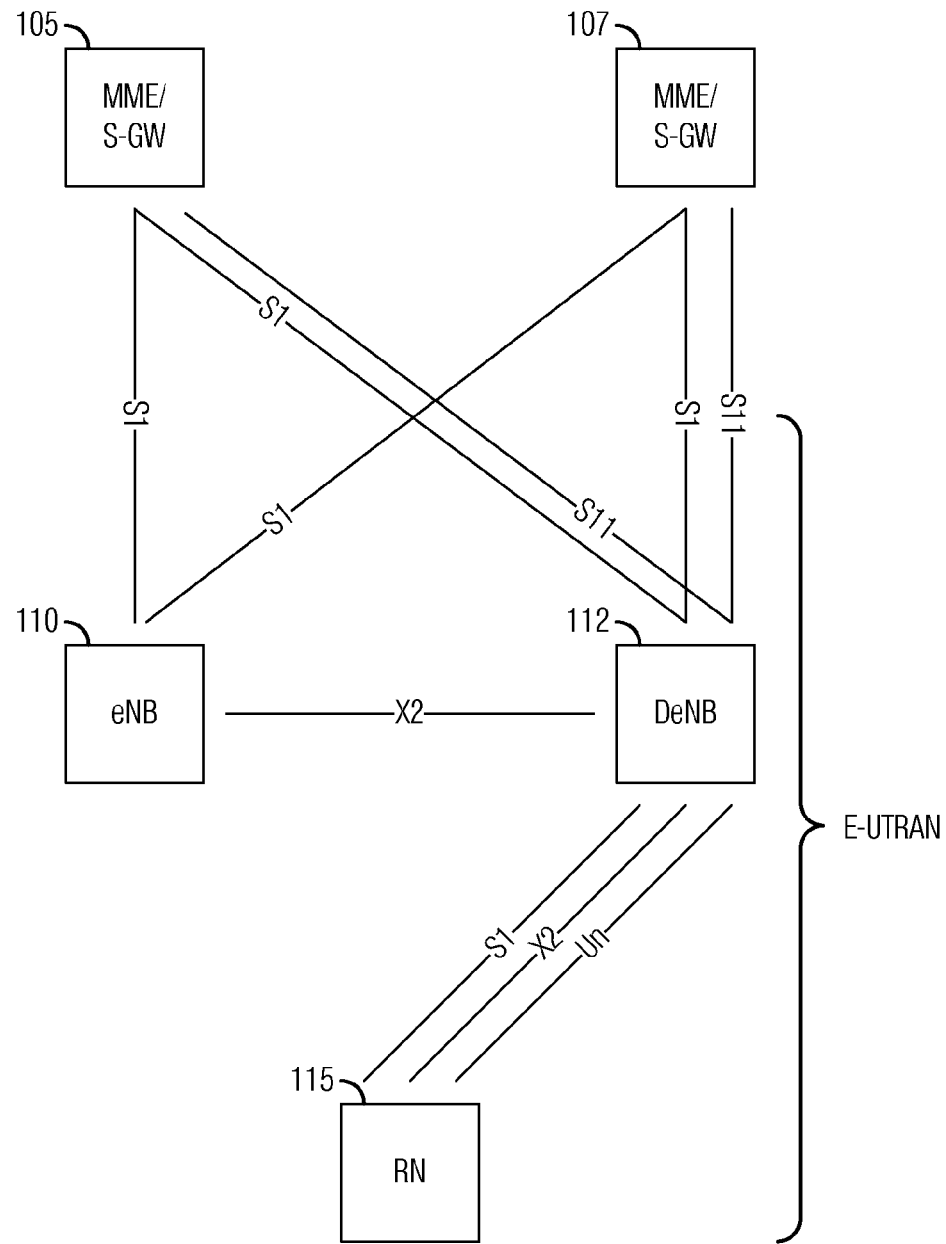
FIG. 1a illustrates an example communications system involving an RN.

FIG. 1a illustrates a communications system 100. Communications system 100 includes a first mobility management entity (MME)/serving gateway (S-GW) 105 and a second MME/S-GW 107. Communications system 100 also includes an eNB 110 and a DeNB 112, with DeNB 112 allocating a portion of its network resources to serve RN 115. eNB 110, DeNB 112, and RN 115 make up an enhanced universal terrestrial radio access network (E-UTRAN) of communications system 100. Also illustrated in FIG. 1 are corresponding interfaces between the various illustrated network entities.

Figure 1B:
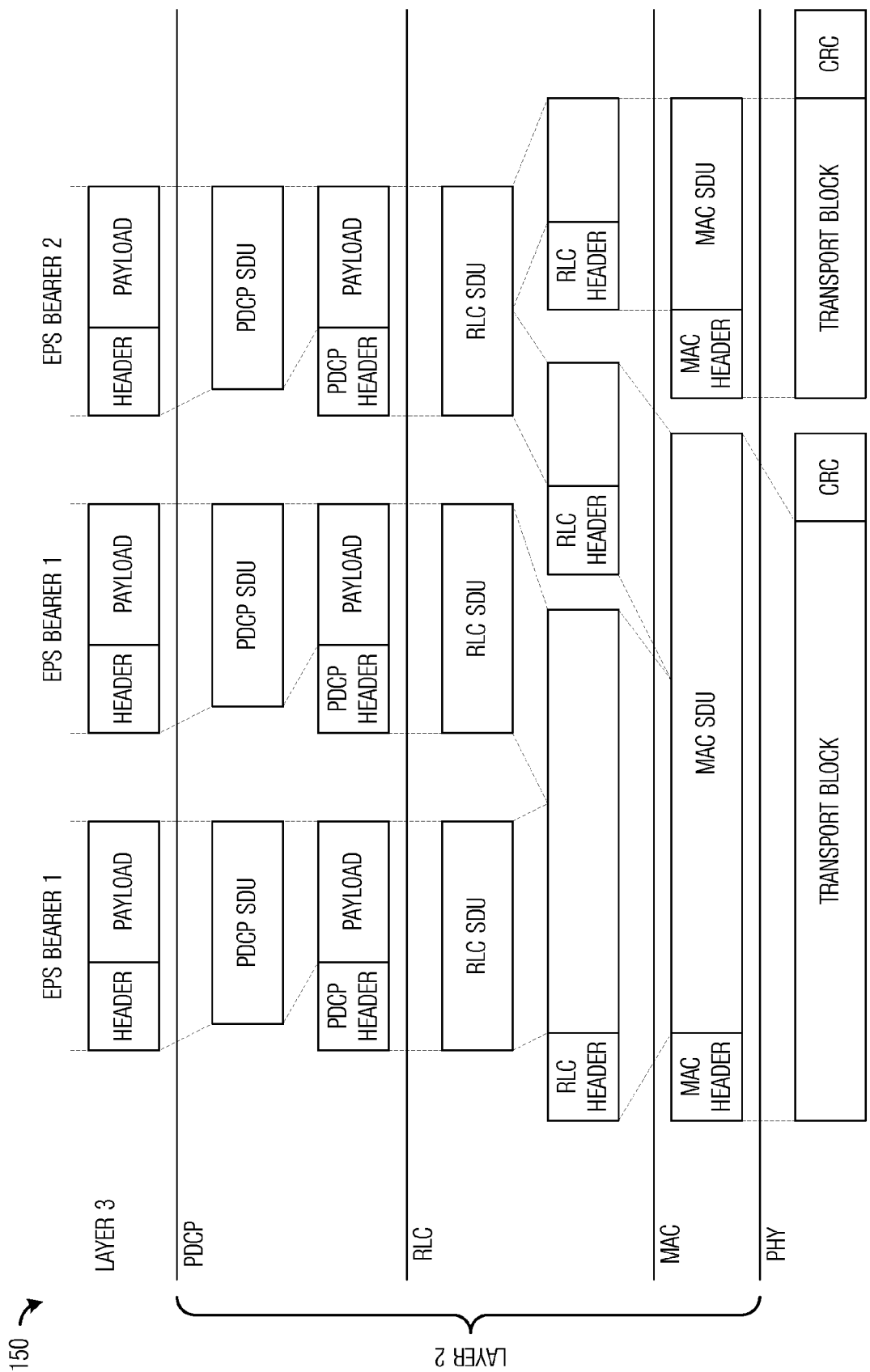
FIG. 1b illustrates an example diagram of data flow of packets through different protocol layers in a multi-layer communications network, such as a 3GPP LTE compliant communications system.

FIG. 1b illustrates a diagram 150 of data flow of packets through different protocol layers in a multi-layer communications network, such as a 3GPP LTE compliant communications system. As shown in FIG. 1b, diagram 150 illustrates a flow of packets through a number of protocol layers in a 3GPP LTE compliant communications system.

Generally, in a transmitting station in a multi-layer communications network, an upper layer packet enters a lower layer as a service data unit (SDU) of the lower layer. The lower layer then forms a lower layer packet by including at least a portion of the upper layer packet as its payload plus a header and/or a trailer corresponding to the lower layer. The formed lower layer packet is also known as the protocol data unit (PDU) of the lower layer, which may enter an even lower protocol layer as an SDU of that even lower protocol layer. Similar process may continue as the packet is passed down through the protocol layers until it reaches the lowest layer and is transmitted over the transmission media. In a receiving station, the same processes are reversed as the packet is passed up through the protocol layers, with each protocol layer peeling off the header and/or trailer that a peer-protocol-layer in the transmitting station has inserted and passing the payload (i.e., the SDU of that protocol layer) up to an upper layer as a PDU of that upper layer.

As an illustrative example, consider a packet of the physical (PHY) layer, which is generally considered to be a first protocol layer (starting from bottom to top) and is also known as the Layer 1, a PHY packet includes a transport block and a trailer. The trailer includes bits, such as cyclic redundancy check (CRC) bits, which may be used to determine if bits in the transport block associated with the trailer has been corrupted during transmission. The transport block may be considered to be a payload of a PHY layer packet and includes a packet from a protocol layer above the PHY layer, which is a media access control (MAC) sublayer in this example.

Above the PHY layer is a second protocol layer, which is also known as the Layer 2 and comprises three sublayers: a media access control (MAC) sublayer (a lowest sublayer), a radio link control (RLC) sublayer (a middle sublayer), and a packet data convergence protocol (PDCP) sublayer (a highest sublayer).

As discussed above, a PDU at any given protocol layer (or sublayer) contains, as its payload, at least a portion of a PDU from an upper layer (or sublayer) along with an appropriate header and/or trailer. Consider the Layer 2 for example: at the MAC sublayer, a MAC PDU contains a MAC header and a payload, which is a MAC SDU and includes at least one RLC PDU; at the RLC sublayer, an RLC PDU contains an RLC header and a payload that contains at least a portion of an RLC SDU, which includes one PDCP PDU; and at the PDCP sublayer, a PDCP PDU contains a PDCP header and a payload that contains one PDCP SDU, which includes at least a portion of an IP packet from a third protocol layer (i.e., the Layer 3) of the network.

Figure 2:
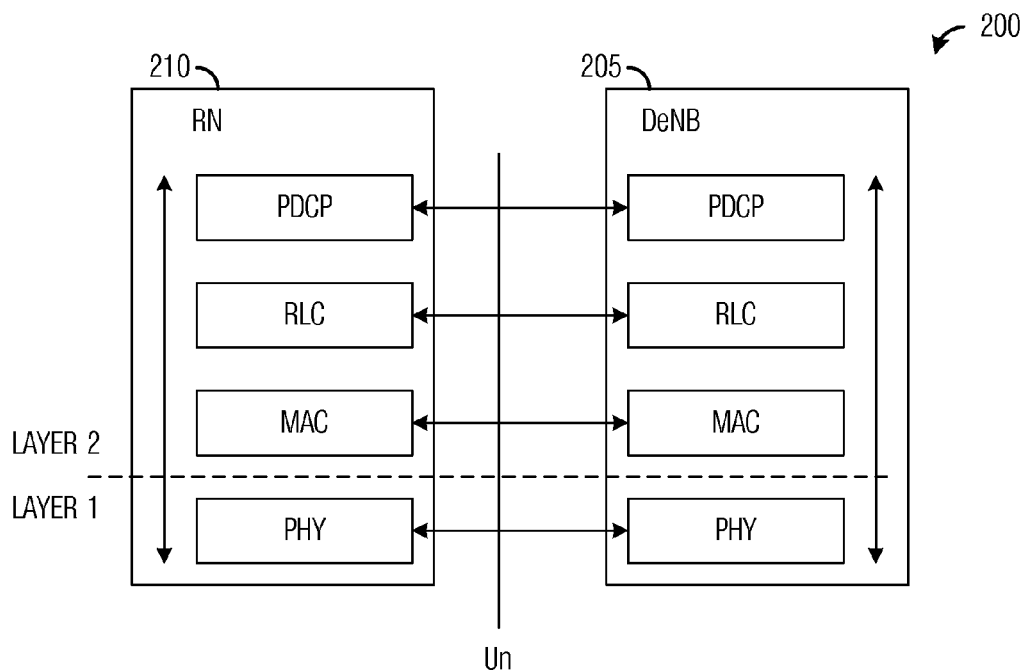
FIG. 2 illustrates an example user plane protocol stack of a portion of a communications system according to example embodiments described herein.

FIG. 2 illustrates a portion of a communications system 200. Communications system 200 includes a DeNB 205 and an RN 210, wherein DeNB 205 is allocating a portion of its radio resources to serve RN 210. The allocated radio resources are used to support the backhaul link for RN 210. Packets from different layers (or sublayers) of protocol stacks of DeNB 205 and RN 210 may be exchanged in a logical manner. However, packets at all layers (or sublayers) are actually converted into PHY packets and exchanged between DeNB 205 and RN 210 over the air. For example, a PDCP packet from DeNB 205 is converted into at least one RLC packet then to at least one MAC packet then to at least one PHY packet. The at least one PHY packet is then sent to RN 210, where the at least one PHY packet is converted back into at least one MAC packet then into at least one RLC packet then at least one PDCP packet.

Typically, congestion control is an important consideration for designers of communications systems. A congested communications system may result in poor service for users of the communications system, and if left unchecked, the congested communications system may rapidly degenerate to a point where no service is provided to any user of the communications system.

A prior art technique for end-to-end congestion control in a communications system has a sender device that provides the source of data packets, a recipient device that receives the data packets, and one or more intermediate communications stations that forward the data packets from the sender device to the recipient device. An intermediate communications station may drop one or more data packets when experiencing congestion. The recipient device may indicate a loss of a packet to the sender device if the recipient device does not receive the packet.

The sender device, in response to the indication from the recipient device that a packet has been lost, reduces (often significantly) its rate of injecting new data packets into the communications system in order to reduce the congestion. This congestion control method is widely used in the wireline network where the loss of packets is mostly due to packets being dropped (i.e., discarded without any part of it being transmitted) by an intermediate communications station as a result of congestion experienced in that communications station. For example, TCP protocol utilizes such as an end-to-end congestion control method.

In a wireless communications system, both the sender device and the recipient device of the data packets may be a UE. Meanwhile, the eNBs, DeNBs, and RNs are the intermediate communications stations. Since TCP protocol is also widely used in wireless communications systems, the congestion control method described above may also be used by an intermediate communications station (e.g., an eNB, a DeNB, or an RN). For example, a DeNB may drop some data packets in a DL to an RN and/or to a UE when the DeNB experiences congestion in the DL.

Currently, a packet discard rate (e.g., a packet discard rate in the DL per Quality of Service (QoS) Class Identifier (QCI)) may be measured by an eNB, which is the transmitting station and may be the packet dropper of the DL data packets intended to a UE. As an example, the packet discard rate may be a ratio of the number of dropped packets to the number of packets that enter a specific protocol layer or sublayer, such as PDCP sublayer, at the transmitting station during the same time period. The packet discard rate may be provided to a management entity, such as an operations and maintenance (OAM) server, for diagnosis and/or remedy purposes.

However, in a wireless communications system, when a packet is transmitted wirelessly, there is a degree of uncertainty as to whether or not the packet will be received by its intended receiving station. Therefore, it may not be possible to determine that a missing packet at the intended receiving station is the result of the packet being dropped by the transmitting station or being transmitted but lost in transmission.

Furthermore, a packet that is intended to a UE being served by an RN but is dropped by the DeNB will not arrive at the RN and therefore, will not arrive at the intended UE. Therefore, the RN may report not dropping any packets, although the intended UE is suffering from the result of the packets dropped by the DeNB, such as missing packets, attenuated source data rate, and so forth.

Additionally, the packet dropper may drop packets at upper protocol layers, such as the network layer in the seven-layer Open Systems Interconnection (OSI) protocols, which is also known as the Layer 3 and also corresponds to the Internet layer in the Internet protocol suite, therefore, the dropped packets will not show up as being dropped in techniques that detect packet dropping at lower protocol layers. Hence, there is a need for a system and method for monitoring dropped packets that will work reliably in a wireless communications system.

Figure 3A:
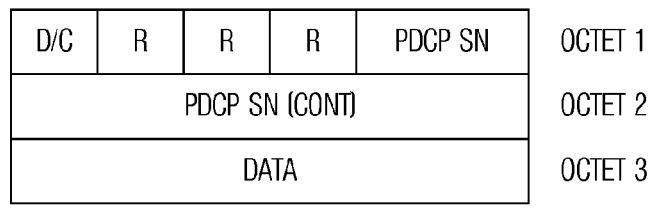
FIG. 3a illustrates an example user plane PDCP data PDU with a long PDCP sequence number according to example embodiments described herein.
Figure 3B:
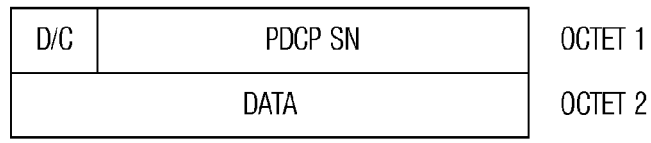
FIG. 3b illustrates an example user plane PDCP data PDU with a short PDCP sequence number according to example embodiments described herein.

FIG. 3a illustrates a user plane PDCP data PDU 300 with a long PDCP sequence number (SN) and FIG. 3b illustrates a user plane PDCP data PDU 350 with a short PDCP sequence number. Both PDCP data PDU 300 and PDCP data PDU 350 include a PDCP sequence number in their PDCP headers, but PDCP data PDU 300 has more bits available in its PDCP SN field than PDCP data PDU 350 (12 bits versus 7 bits). Therefore, PDCP data PDU 300 can keep track of more unique PDCP data PDUs. Similarly, there is an RLC sequence number in the RLC header of an RLC PDU.

The RLC sequence number may be used to ensure reliable and in-sequence delivery of packets over the same radio connection, which may include detection and discarding of packets received in duplication, reordering packets if they are received out of order, and detection of loss of packets and requesting retransmissions of lost packets. The PDCP sequence number may be used to ensure in-sequence delivery of packets when the radio connection is changed or reset, e.g. due to recovery from a radio link failure or handover of the UE.

FIG. 4a illustrates a sequence of PDCP packets (i.e., PDCP PDUs) 405 and a sequence of RLC packets (i.e., RLC PDUs) 410. Sequence of PDCP packets 405 includes a plurality of PDCP packets, including PDCP 0 406, PDCP 1 407, and PDCP 2 408. Similarly, sequence of RLC packets 410 includes a plurality of RLC packets, include RLC 0 411, RLC 1 412, and RLC 2 413. As shown in FIG. 4a, both sequences are continuous with no missing packets.

FIG. 4b illustrates a sequence of PDCP packets 425 and a sequence of RLC packets 430. Sequence of PDCP packets 425 includes a plurality of PDCP packets, including PDCP 0 426, and PDCP 1 427. However, sequence of PDCP packets 425 is missing a PDCP packet (shown in FIG. 4b as PDCP packet XXX 428). Similarly, sequence of RLC packets 430 includes a plurality of RLC packets, include RLC 0 431, RLC 1 432, and RLC 4 433.

As shown in FIG. 4b, sequence of PDCP packets 425 is missing a PDCP packet, with PDCP packet 4 missing between PDCP packet 3 and PDCP packet 5. However, sequence of RLC packets 430 is continuous with no missing packet. The absence of a packet in sequence of PDCP packets 425 while sequence of RLC packets 430 is continuous may imply that a packet was dropped at the PDCP sublayer by the transmitting station.

FIG. 4c illustrates a sequence of PDCP packets 445 and a sequence of RLC packets 450. Sequence of PDCP packets 445 includes a plurality of PDCP packets, including PDCP 0 446, and PDCP 1 447. However, sequence of PDCP packets 445 is missing a PDCP packet (shown in FIG. 4c as PDCP packet XXX 448). Similarly, sequence of RLC packets 450 includes a plurality of RLC packets, include RLC 0 451, and RLC 1 452. However, sequence of RLC packets 450 is also missing an RLC packet (shown in FIG. 4c as RLC packet YYY 453).

As shown in FIG. 4c, both sequence of PDCP packets 445 and sequence of RLC packets 450 are missing packets (PDCP packet XXX 448 and RLC packet YYY 453). The absence of packets in sequence of PDCP packets 445 and sequence of RLC packets 450 may imply that a packet was lost in transmission and not dropped.

Therefore, a dropped packet at an n-th protocol layer of a communications system may be detected as a discontinuity in a number sequence associated with the n-th layer and no discontinuity in a number sequence associated with an m-th layer, where the m-th layer is lower in a layered protocol stack than the n-th layer. Similarly, a lost packet may be detected as a discontinuity in number sequences associated with both the n-th layer and the m-th layer.

Figure 5:
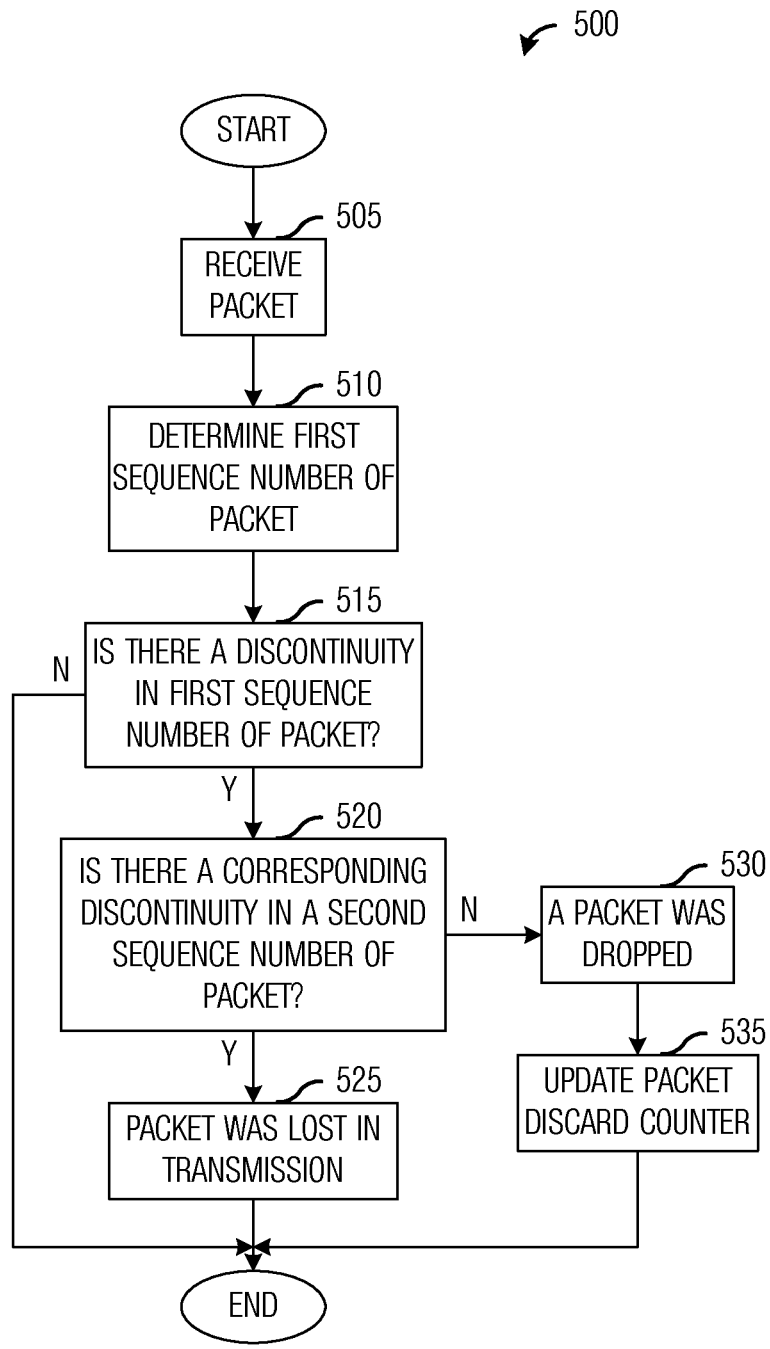
FIG. 5 illustrates an example flow diagram of operations in monitoring dropped packets and updating a packet discard counter according to example embodiments described herein.

FIG. 5 illustrates a flow diagram of operations 500 in monitoring dropped packets and updating a packet discard counter. Operations 500 may be indicative of operations occurring in a communications device that is receiving packets from a communications station, which is transmitting the packets and is the packet dropper. Thus, the communication device is a receiving station and is also a victim of the packet dropper. For example, operations 500 may occur in an RN receiving packets from another RN or a DeNB, or a UE receiving packets from an RN or an eNB. Operations 500 may occur while the communications device is in a normal operating mode.

Operations 500 may begin with the communications device receiving a packet (block 505). According to an example embodiment, the packet may be received by the communications device as a PHY layer packet.

The communications device may determine a first sequence number for the packet (block 510). Depending on which protocol layer the first sequence number corresponds to, the communications device may need to process the packet several times. For example, if the first sequence number corresponds to a PDCP sequence number, then the communications device may need to process the PHY packet to produce a MAC packet and then process the MAC packet to produce an RLC packet and then process the RLC packet to produce the PDCP packet. At that point, the communications device may determine the PDCP sequence number from the PDCP header of the PDCP packet.

The communications device may determine if there is a discontinuity in the first sequence number of the packet (block 515). Generally, since the packets may arrive at the communications device in an order that is different from how they were sent, it may not be possible to simply compare the first sequence number (or any other sequence number) of the packet with the first sequence number of previously received packets, a different technique may be needed to check for sequence number discontinuities. For example, a sliding observation window technique may be used to examine the first sequence number of a plurality of packets in order to determine if there is a discontinuity in the first sequence number. A size of the sliding window may have an impact on how well discontinuities are detected. A large sliding window may allow for more received packets to be examined, but may cause greater latency, as well as require more memory to store a larger number of packets. While a small sliding window may cause less latency and use less memory, but may not examine as many received packets, and more sequence number discontinuity false positives may be detected.

For another example, a re-ordering timer technique may be used. When a packet is received with a first sequence number that is not the next expected first sequence number and is greater than the next expected first sequence number, the re-ordering timer may be started with a pre-defined timer value. If the packet with the next expected first sequence number is received later, the re-ordering timer is stopped. Otherwise, if the re-ordering timer expires without the packet with the next expected sequence number being received, a discontinuity of the first sequence number may be declared.

If a sequence number discontinuity in the first sequence number was not detected, then operations 500 may terminate.

If a sequence number discontinuity was detected, then the communications device may need to perform further processing to determine the nature of the discontinuity. According to an example embodiment, the communications device may determine the nature of the discontinuity by determining if there is also a corresponding discontinuity in a second sequence number (block 520). In general, the second sequence number may be a sequence number from a lower protocol layer than the protocol layer of the first sequence number. For example, if the first sequence number is a PDCP sequence number, then the second sequence number may be an RLC sequence number.

According to an example embodiment, the discontinuity in the second sequence number corresponds to the discontinuity in the first sequence number if the discontinuities occur in packets that are close together in time. A packet time stamp or time mark, such as time of injection into the communications system, time of reception at the communications device, time of generation, or so forth, may be used to determine if the packets are close together in time. If the times associated with packets corresponding to sequence number discontinuities are not close together, then the discontinuities may be unrelated and may not be useful in determining the nature of the first sequence number discontinuity.

According to another example embodiment, the correspondence between discontinuity in the second sequence number and the discontinuity in the first sequence number can be determined by using the second sequence numbers immediately before and after the missing second sequence number and the first sequence numbers immediately before and after the missing first sequence number. For example, consider a situation wherein a second sequence number of n is missing and a first sequence number of m is also missing. If the first sequence number of m+1 can be found in an upper layer packet that is extracted from the lower layer packet with the second sequence number of n+1 and the first sequence number of m−1 can be found in an upper layer packet that is extracted from the lower layer packet with the second sequence number of n−1, then it can be determined that the missing second sequence number of n corresponds to the missing first sequence number of m.

If there is a corresponding discontinuity in the second sequence number, then there was a packet lost in transmission (block 525). There was a packet lost in transmission since the packet was lost in both protocol layers. If the packet had been purposefully dropped in an upper layer, then there would not have been a corresponding packet missing in a lower layer since a packet following the dropped packet at the upper layer may have been perceived at the lower layer as being a follow on packet to a packet preceding the dropped packet, i.e., the dropped packet. Operations 500 may then terminate.

If there was not a corresponding discontinuity in the second sequence number, then the packet was purposefully dropped at the transmitting station (block 530) and the communications device may update its packet discard counter for periodically computing the packet discard rate for the transmitting station (block 535). According to an example embodiment, after updating the packet discard counter, the communications device may perform a number of operations. For example, the communications device may compute the packet discard rate periodically by dividing the number of discarded packets by the number of packets entering the protocol layer where the packet dropping is being monitored during the same time period. The communications device may report the packet discard rate to a management entity, such as an OAM server, periodically or whenever the packet discard rate exceeds a packet discard rate threshold, for example. Alternatively, the communications device may maintain a record of the packet discard rate and then report the packet discard rate to the management entity at specified times, or upon an occurrence of an event, such as a receipt of an instruction to report the packet discard rate, an error rate meeting a specified error threshold, a data rate of a communications link meeting a specified data rate threshold, or so on. Operations 500 may then terminate.

According to an example embodiment, upon radio resource control reestablishment and/or handover, the communications device may stop monitoring dropped packets. The communications device may then reset the packet discard counter. Alternatively, if the communications device has been monitoring dropped packets for a sufficiently long period of time, i.e., if the communications device has enough samples in the packet discard counter, the communications device may compute a final packet discard rate prior to resetting the packet discard counter after radio resource control reestablishment and/or handover and report the final packet discard rate to the management entity. After resetting the packet discard counter, the communications device may resume monitoring dropped packets over the newly (re)-established radio link.

Figure 6:
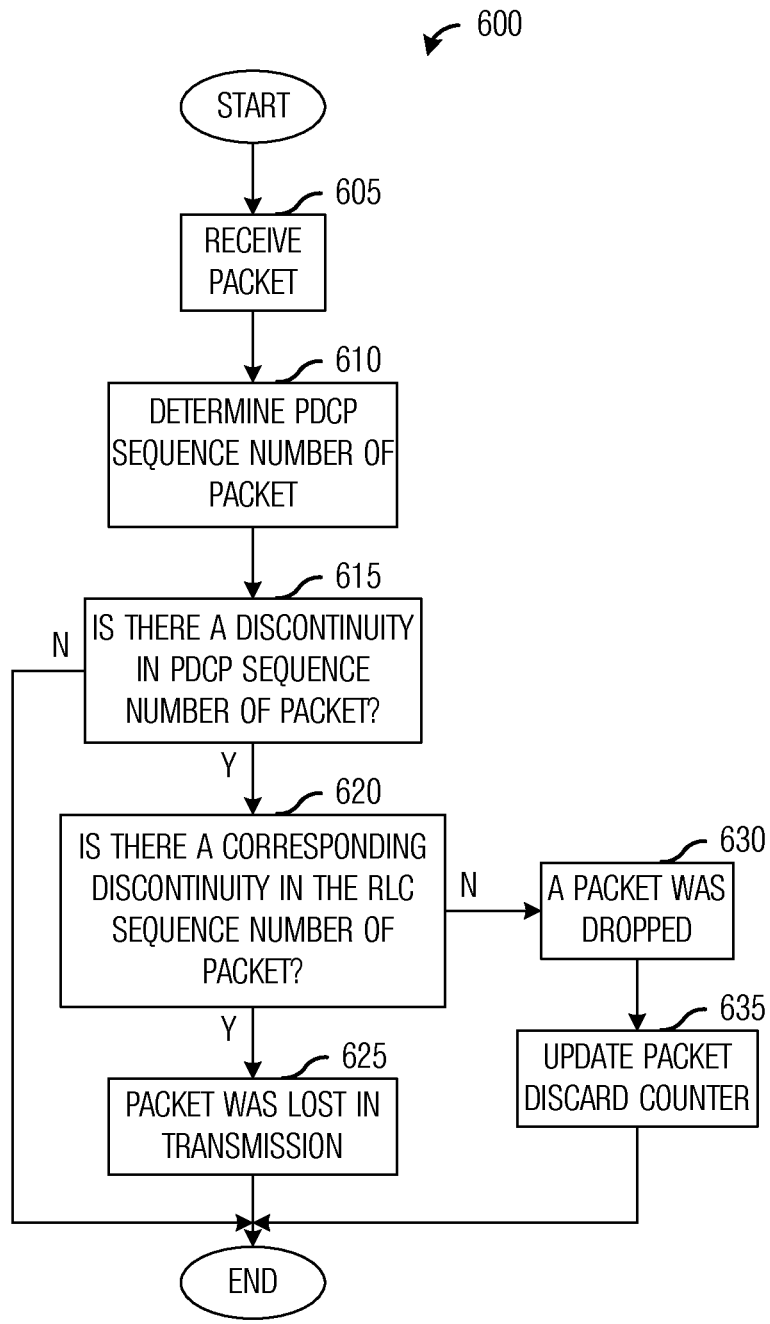
FIG. 6 illustrates an example flow diagram of operations in monitoring dropped packets occurring in Layer 2 and updating a packet discard counter according to example embodiments described herein.

FIG. 6 illustrates a flow diagram of operations 600 in monitoring dropped packets occurring in the Layer 2 and updating a packet discard counter. Operations 600 may be indicative of operations occurring in a communications device that is receiving packets from a communications station, which is transmitting the packets and is the packet dropper, and the communications device monitoring packet drops in the Layer 2. Thus, the communication device is a receiving station and is also a victim of the packet dropper. For example, operations 600 may occur in an RN receiving packets from another RN or a DeNB, or a UE receiving packets from an RN or an eNB. Operations 600 may occur while the communications device is in a normal operating mode.

Operations 600 may begin with the communications device receiving a packet (block 605). According to an example embodiment, the packet may be received by the communications device as a PHY layer packet.

The communications device may determine a PDCP sequence number for the packet (block 610). The communications device may determine the PDCP sequence number from the PDCP header of the packet. The communications device may determine if there is a discontinuity in the PDCP sequence number of the packet (block 615).

If a sequence number discontinuity in the PDCP sequence number was not detected, then operations 600 may terminate. If a sequence number discontinuity in the PDCP sequence number was detected, then the communications device may need to perform further processing to determine the nature of the discontinuity. According to an example embodiment, the communications device may determine the nature of the discontinuity by determining if there is also a corresponding discontinuity in an RLC sequence number for the packet (block 620).

If there is a corresponding discontinuity in the RLC sequence number, then there was a packet lost in transmission (block 625). If there was not a corresponding discontinuity in the RLC sequence number, then the packet was purposefully dropped in the Layer 2 at the transmitting station (block 630) and the communications device may update its Layer 2 packet discard counter for computing the packet discard rate for the transmitting station (block 635).

In the absence of a corresponding discontinuity in the RLC sequence number, the communications device may further dismiss a sequence number discontinuity in the PDCP sequence number as a packet being dropped if the PDCP entity determines that an integrity verification failure or header decompression failure has occurred to the PDCP PDU with the missing the PDCP sequence number.

Figure 7:
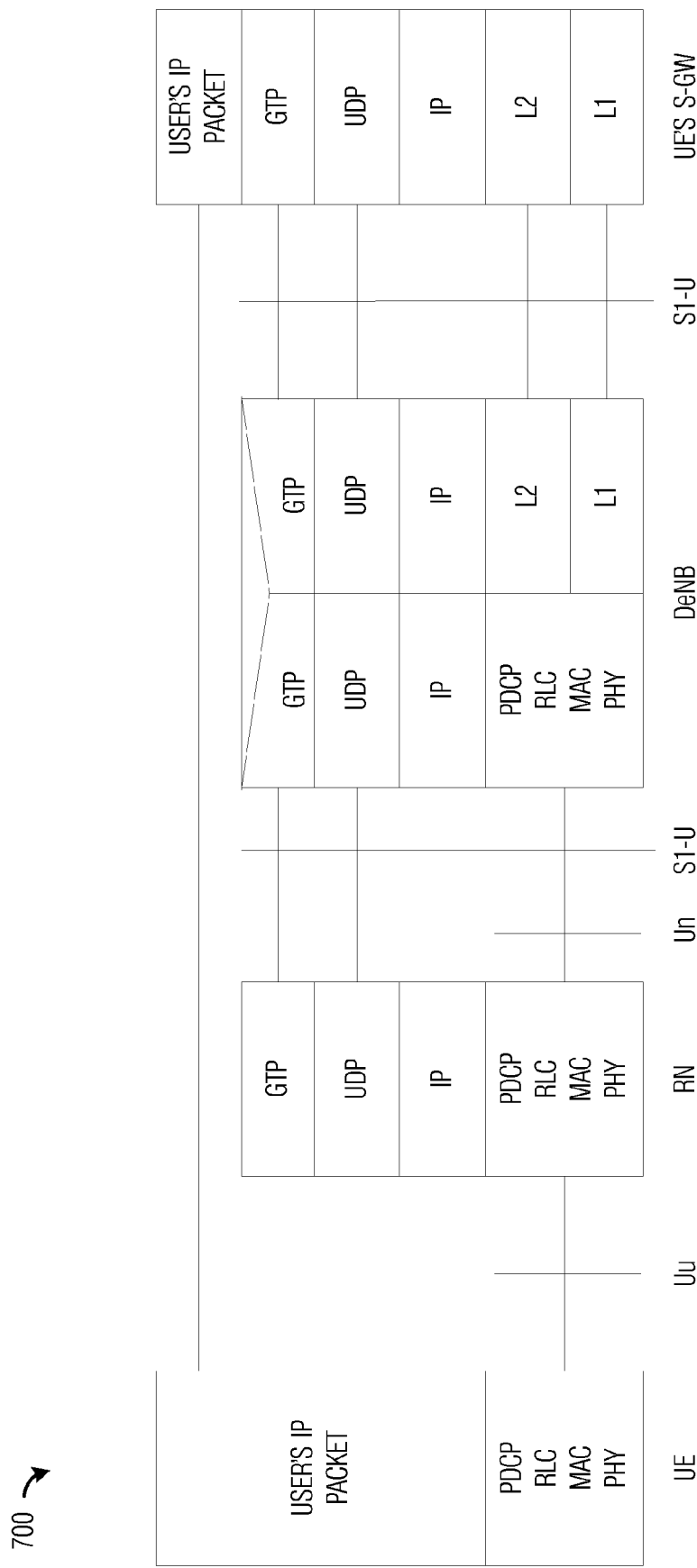
FIG. 7 illustrates an example user plane protocol stack of a communications system that includes RNs according to example embodiments described herein.

FIG. 7 illustrates a user plane protocol stack 700 of a communications system that includes RNs. As shown in user plane protocol stack 700, a UE's IP packet may be carried inside a General Packet Radio System (GPRS) Tunneling Protocol User Plane (GTP-U) packet over two concatenated GTP tunnels that are specific for the UE's Evolved Packet System (EPS) bearer. These two concatenated GTP tunnels may be identified by the GTP Tunnel Endpoint Identifiers (TEIDs) in the GTP-U headers and may span from the UE's S-GW to a DeNB and from the DeNB to the RN, respectively.

Between the DeNB and the RN, the GTP-U packet with the UDP/IP header form an outer IP packet, which may be carried over a Un link with the RN's IP address as the destination IP address. Therefore, the Layer 2 protocol of the Un link may treat the outer IP packet as a PDCP SDU for a Data Radio Bearer (DRB) of the RN. After receiving an outer IP packet on a DRB over the Un link and striping off the GTP-U, UDP, and IP headers, the RN may forward the UE's IP packet to the UE over a Uu link on a DRB that is one-to-one mapped to the GTP tunnel on which the UE's IP packet is carried from the DeNB to the RN.

FIG. 8 illustrates a GTP-U header 800. GTP-U header 800 includes a sequence number (octets 8 and 9) that can be used to keep track of GTP-U packets.

Figure 9:
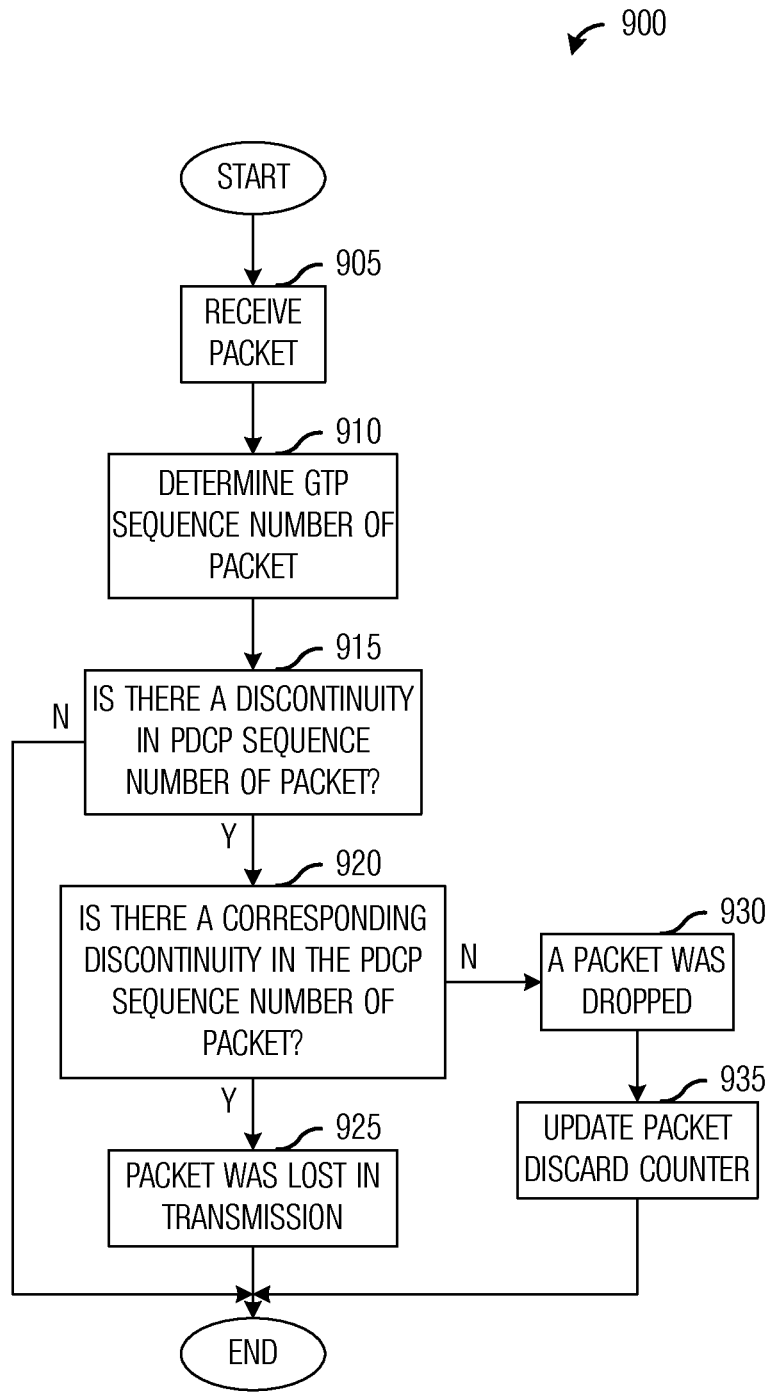
FIG. 9 illustrates an example flow diagram of operations in monitoring dropped packets occurring in Layer 3 or higher and updating a packet discard counter according to example embodiments described herein.

FIG. 9 illustrates a flow diagram of operations 900 in monitoring dropped packets occurring in the Layer 3 or higher and updating a packet discard counter. Operations 900 may be indicative of operations occurring in a communications device that is receiving packets from a communications station, which is transmitting the packets and is the packet dropper, and the communications device monitoring packet drops in the Layer 3 or higher. Thus, the communication device is a receiving station and is also a victim of the packet dropper. For example, operations 900 may occur in an RN receiving packets from another RN or a DeNB, or a UE receiving packets from an RN or an eNB. Operations 900 may occur while the communications device is in a normal operating mode.

Operations 900 may begin with the communications device receiving a packet, such as a GTP-U packet (block 905). According to an example embodiment, the packet may be received by the communications device as a PHY layer packet, which may then be processed as it traverses up the protocol layers.

The communications device may determine a GTP sequence number for the packet (block 910). The communications device may determine the GTP sequence number from the GTP-U header of the packet. The communications device may determine if there is a discontinuity in the GTP sequence number of the packet (block 915).

If a sequence number discontinuity in the GTP sequence number was not detected, then operations 900 may terminate. If a sequence number discontinuity in the GTP sequence number was detected, then the communications device may need to perform further processing to determine the nature of the discontinuity. According to an example embodiment, the communications device may determine the nature of the discontinuity by determining if there is also a corresponding discontinuity in a PDCP sequence number for the packet (block 920).

If there is a corresponding discontinuity in the PDCP sequence number then there was a packet lost in transmission or was dropped in the Layer 2 (block 925). To further differentiate between a packet lost in transmission and a packet dropped in the Layer 2, the techniques described before and in FIG. 6 may be used. If there was not a corresponding discontinuity in the PDCP sequence number, then the packet was purposefully dropped in the Layer 3 or higher at the transmitting station (block 930) and the communications device may update its Layer 3 packet discard counter for computing the packet discard rate for the transmitting station (block 935).

According to an example embodiment, the communications device may utilize sequence numbers of other upper layer protocols, such as TCP, Real-time Transport Protocol (RTP), or so on. The communications device may perform deep packet inspection (DPI) of the packet to retrieve the sequence numbers of these upper layer protocols. Furthermore the communications device may determine the nature of the discontinuity in an upper layer by searching for a corresponding discontinuity in a lower layer sequence number.

According to an example embodiment, a communications device may monitor for dropped packets in multiple protocol layers. For example, the communications device may monitor for packets dropped in the Layer 3 by monitoring for discontinuities in GTP sequence numbers and PDCP sequence numbers, as well as packets dropped in the Layer 2 by monitoring for discontinuities in PDCP sequence numbers and RLC sequence numbers.

According to an example embodiment, when the communications device monitors for dropped packets in multiple protocol layers, the communications device may maintain a packet discard counter and compute a packet discard rate for each of the multiple protocol layers or the communications device may maintain an aggregate packet discard counter and compute an aggregated packet discard rate for all of the protocol layers. Alternatively, the communications device may maintain a separate packet discard counter and compute a separate packet discard rate for some of the protocol layers, while maintaining an aggregate packet discard counter and computing an aggregated packet discard rate for other protocol layers.

According to an example embodiment, the monitoring of dropped packets may be performed per quality of service (QoS) class of radio access bearer (such as an enhanced radio access bearer (E-RAB)) of the RN over the Un link, or per QoS class of the UE's (UE being served by the RN) evolved packet system (EPS) bearer. Both methods are suitable for monitoring of dropped packet at the Layer 3. The monitoring of dropped packets on a per QoS class of the UE's bearer basis may provide more accurate packet discard rates on a per QoS class basis, since one RN's E-RAB may carry multiple UEs's EPS bearers with potentially different QoS classes. While the monitoring of dropped packets per QoS class of the RN's bearer basis may involve the use of less resources and is only suitable on monitoring of dropped packets at the Layer 2. Therefore, if the monitoring of dropped packets is performed at both the Layer 3 and Layer 2 and if the combined packet discard rate is to be computed, it is a preferred embodiment to perform the monitoring of dropped packets per QoS class of RN's E-RAB over the Un link.

According to an example embodiment, the monitoring of dropped packets as described herein may be applied to multi-hop relay networks.

Figure 10:
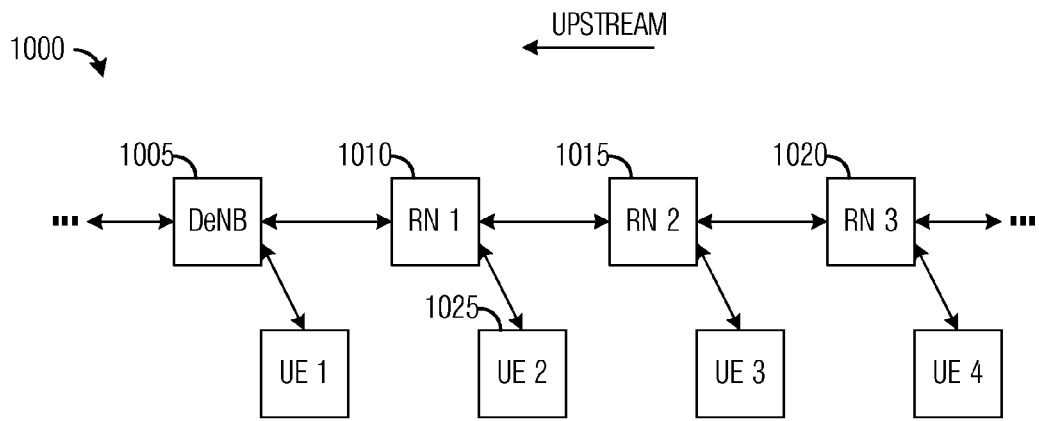
FIG. 10 illustrates an example communications system with multi-hop relay segments according to example embodiments described herein.

FIG. 10 illustrates a communications system 1000. Communications system 1000 includes at least one multi-hop relay segment comprising a DeNB 1005, a first RN 1010, a second RN 1015, a third RN 1020, and so forth, with the DeNB further connecting to a wire-lined network. While it is understood that communications systems may employ multiple eNBs and RNs capable of communicating with a number of UEs, only one DeNB, three RNs, and four UEs are illustrated for simplicity.

In a multi-hop relay system, an upstream RN may be seen as a DeNB by its immediate downstream RNs (RNs that are directly served by the upstream RN). As an example, first RN 1010 appears as a DeNB to second RN 1015. Similarly, a downstream RN may be seen as a UE by its immediate upstream RNs (RNs that are directly serving the downstream RN as a DeNB). As an example, third RN 1020 is seen as a UE to second RN 1015.

Therefore, in a multi-hop relay system, an RN may monitor dropped packets from its DeNB or its immediate upstream RN, which is functioning as the RN's DeNB. According to an example embodiment, the packets that may be monitored by the RN may include packets intended for UEs served by the RN. The packets that may be monitored by the RN may further include packets intended for UEs being served by immediate and non-immediate downstream RNs of the RN. As an example, first RN 1010 may monitor packets intended for its UEs, including UE 1025, as well as packets for UEs being directly served by second RN 1015, third RN 1020, and so on.

Figure 11:
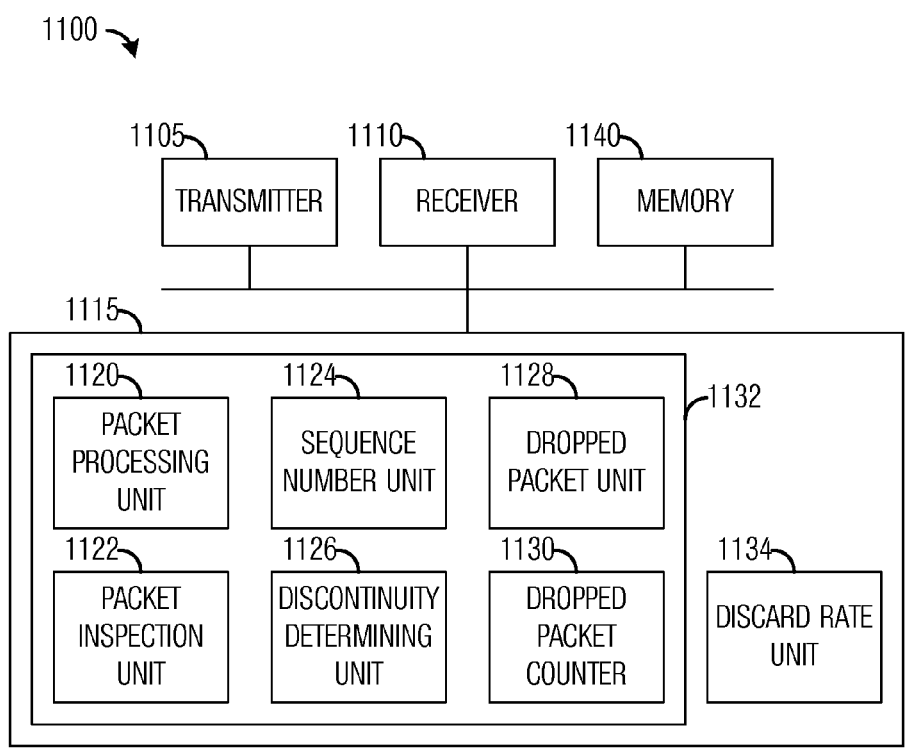
FIG. 11 provides an example communications device according to example embodiments described herein.

FIG. 11 provides an illustration of a communications device 1100. Communications device 1100 may be an implementation of an RN, a UE, an ad-hoc network node, a mesh network node, or so on. Communications device 1100 may be used to implement various ones of the embodiments discussed herein. As shown in FIG. 11, a transmitter 1105 is configured to transmit information and a receiver 1110 is configured to receive information.

A packet processing unit 1120 is configured to process packets received at receiver 1110. As an example, packet processing unit 1120 may strip off headers to retrieve a payload of the packet. Packet processing unit 1120 may also process information, such as sequence numbers, and so forth in the headers. A packet inspection unit 1122 is configured to inspect the content of packets, potentially without actually processing the packets. Packet inspection unit 1122 allows for the inspection of upper layer information contained in a packet without applying processing consistent with intervening protocol layers.

A sequence number unit 1124 is configured to process sequence numbers, such as GTP sequence numbers, PDCP sequence numbers, RLC sequence numbers, TCP sequence numbers, RTP sequence numbers, and so forth. A discontinuity determining unit 1126 is configured to determine if a discontinuity exists in a sequence number for a sequence of packets. A dropped packet unit 1128 is configured to determine if a packet has been dropped. Dropped packet unit 1128 determines if the packet has been dropped by comparing discontinuities in sequence numbers for packets. A dropped packet counter 1130 is configured to maintain a count of dropped packets. Dropped packet counter 1130 may include counters for multiple protocol layers.

Collectively, packet processing unit 1120, packet inspection unit 1122, sequence number unit 1124, discontinuity determining unit 1126, dropped packet unit 1128, and dropped packet counter 1130 form a processing unit 1132.

A discard rate unit 1134 is configured to determine a packet discard rate. Discard rate unit 1134 may determine separate packet discard rates, an aggregate packet discard rate, or a combination thereof. A memory 1140 is configured to store packet discard counters, total packet counters, packet discard rates, sequence numbers, and so forth.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while packet processing unit 1120, packet inspection unit 1122, sequence number unit 1124, discontinuity determining unit 1126, dropped packet unit 1128, dropped packet counter 1130 (processing unit 1132) and discard rate unit 1134 may be software modules executing in a microprocessor (such as processor 1115), a custom circuit, a custom compiled logic array of a field programmable logic array, or combinations thereof.

The above described embodiments of communications device 1100 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims - and in the description of the flow diagrams(s) for FIGS. 5, 6, and 9—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operations, the method comprising:
   receiving a sequence of packets from a transmitting station, wherein each packet in the sequence of packets comprises a protocol layer packet for each protocol layer of multi-layered network; and
   determining, with the communications device, if a packet in the sequence of packets has been dropped by the transmitting station in accordance with at least two sets of sequence numbers associated with different protocol layers of packets in the sequence of packets, wherein the at least two sets of sequence numbers comprise a first set of sequence numbers and a second set of sequence numbers;
   processing, with the communications device, the packet in accordance with the determining if a packet in the sequence of packets has been dropped by the transmitting station;
   determining if there is a first discontinuity in the first set of sequence numbers, wherein the first set of sequence numbers is associated with first protocol layer packets of the sequence of packets; and
   determining if there is a corresponding first discontinuity in the second set of sequence numbers, wherein the second set of sequence numbers is associated with second protocol layer packets of the sequence of packets, wherein the first protocol layer packets belong to an higher protocol layer than the second protocol layer packets, and wherein a corresponding first discontinuity comprises a discontinuity in the second set of sequence numbers that occurs at a same time mark as the first discontinuity in the first set of sequence numbers.

2. The method of claim 1, further comprising updating a packet discard counter in accordance with the determining.

3. The method of claim 1, further comprising determining that a packet associated with the first discontinuity has been dropped if there is the first discontinuity in the first set of sequence numbers but there is not the corresponding first discontinuity in the second set of sequence numbers.

4. The method of claim 3, wherein determining that a packet associated with the first discontinuity has been dropped further comprises determining that the packet was dropped in a first protocol layer by the transmitting station of the sequence of packets.

5. The method of claim 1, wherein determining if a packet in the sequence of packets has been dropped further comprises determining that the packet associated with the first discontinuity has been lost in transmission if there is the first discontinuity in the first set of sequence numbers and if there is the corresponding first discontinuity in the second set of sequence numbers.

6. The method of claim 1, wherein determining if there is a first discontinuity in the first set of sequence numbers comprises determining if there is a missing sequence number in the first set of sequence numbers.

7. The method of claim 6, wherein determining if there is a first discontinuity in the first set of sequence numbers occurs for packets in the sequence of packets received within a lime window, and wherein there is a first discontinuity in the first set of sequence numbers if there is a missing sequence number in the first set of sequence numbers of the packets in the sequence of packets received during the time window.

8. The method of claim 1, wherein the first protocol layer comprises a packet data convergence protocol sublayer, and the second protocol layer comprises a radio link control sublayer.

9. The method of claim 1, wherein the first protocol layer comprises a General Packet Radio System Tunneling Protocol user plane, and the second layer comprises a packet data convergence protocol sublayer.

10. The method of claim 1, wherein determining if a packet in the sequence of packets has been dropped further comprises:
   determining if there is a second discontinuity in the second set of sequence numbers;
   determining if there is a corresponding second discontinuity in a third set of sequence numbers, wherein the third set of sequence numbers is associated with third protocol layer packets of the sequence of packets, wherein the third protocol layer packets belong to a lower protocol layer than the second protocol layer packets;

determining that a packet associated with the second discontinuity has been dropped if there is the second discontinuity in the second set of sequence numbers but there is not the corresponding second discontinuity in the third set of sequence numbers; and determining that the packet associated with the second discontinuity has been lost in transmission if there is the second discontinuity in the second set of sequence numbers and if there is the corresponding second discontinuity in the third set of sequence numbers.

11. The method of claim 10, wherein determining that a packet associated with the second discontinuity has been dropped further comprises determining that the packet was dropped in the second protocol layer by the transmitting station of the sequence of packets.

12. The method of claim 10, wherein the first protocol layer comprises a General Packet Radio System Tunneling Protocol user plane, the second protocol layer comprises a packet data convergence protocol sublayer, and the third protocol layer comprises a radio link control sublayer.

13. The method of claim 1, wherein the communications device comprises a relay node and the transmitting station comprises a donor enhanced NodeB.

14. The method of claim 1, wherein a set of sequence numbers comprises a General Packet Radio Service Tunneling Protocol sequence numbers, packet data convergence protocol sequence numbers, radio link control sequence numbers, transmission control protocol sequence numbers, Real-time Transport Protocol sequence numbers, or combinations thereof.

15. The method of claim 1, wherein two protocol layers associated with the first set of sequence numbers and the second set of sequence numbers are adjacent to one another in a multi-layered protocol stack.

16. A method for communications device operations, the method comprising:
 determining a first sequence number of a received packet in a sequence of packets, wherein the first sequence number is associated with a first protocol layer;
 determining, with the communications device, if there is a discontinuity in the first sequence number; and
 if there is a discontinuity in the first sequence number,
  determining a second sequence number of the received packet, wherein the second sequence number is associated with a second protocol layer, and wherein the second protocol layer is lower in a protocol layer structure than the first protocol layer,
  determining if there is a corresponding discontinuity in the second sequence number,
  if there is the corresponding discontinuity in the second sequence number, determining that a packet in the sequence of packets was lost in transmission and processing the packet in accordance with determining that the packet in the sequence of packets was lost in transmission, and
  if there is not the corresponding discontinuity in the second sequence number, determining that the packet in the sequence of packets was dropped by a transmitting station and processing the packet in accordance with determining that the packet in the sequence of packets was dropped by the transmitting station.

17. The method of claim 16, wherein the corresponding discontinuity comprises a discontinuity in the second sequence number that occurs at a same time mark as the discontinuity in the first sequence number.

18. The method of claim 16, further comprising updating a packet discard counter if it is determined that the packet was dropped by the transmitting station.

19. The method of claim 16, wherein the received packet is processed if there is not the discontinuity in the first sequence number.

20. The method of claim 16, wherein determining a first sequence number comprises:
 processing the received packet to produce a first protocol layer packet; and
 retrieving the first sequence number from a header of the first protocol layer packet.

21. The method of claim 16, wherein determining if there is a discontinuity in the first sequence number comprises:
 examining a plurality of first sequence numbers for a plurality of packets; and
 determining that there is a discontinuity if there is at least one first sequence number missing from the plurality of first sequence numbers.

22. The method of claim 21, wherein the plurality of packets comprises packets received at the communications device within a specified time interval.

23. The method of claim 16, further comprising computing and reporting a packet discard rate.

24. The method of claim 16, wherein the first protocol layer comprises a packet data convergence protocol sublayer, and wherein the second protocol layer comprises a radio link control sublayer.

25. The method of claim 16, wherein the first protocol layer comprises a General Packet Radio System Tunneling Protocol user plane, and wherein the second protocol layer comprises a packet data convergence protocol sublayer.

26. A communications device comprising:
 a receiver configured to receive a sequence of packets from a transmitting station, wherein each packet in the sequence of packets comprises a protocol layer packet for each protocol layer of multi-layered network;
 a processing unit coupled to the receiver, the processing unit configured to determine if a packet in the sequence of packets has been dropped by the transmitting station, wherein the processing unit determines that the packet has been dropped in accordance with at least two sets of sequence numbers associated with different protocol layers of packets in the sequence of packets, and to count a number of dropped packets, wherein the at least two sets of sequence number comprise a first set of sequence numbers and a second set of sequence numbers; and
 a discontinuity determining unit configured to determine if there is a first discontinuity in the first set of sequence numbers, wherein the first set of sequence numbers is associated with first protocol layer packets of the sequence of packets and to determine if there is a corresponding first discontinuity in the second set of sequence numbers, wherein the second set of sequence numbers is associated with second protocol layer packets of the sequence of packets, wherein the first protocol layer packets belong to a higher protocol layer than the second protocol layer packets, and wherein a corresponding first discontinuity comprises a discontinuity in the second set of sequence numbers that occurs at a same time mark as the first discontinuity in the first set of sequence numbers.

27. The communications device of claim 26, further comprising a discard rate unit coupled to the processing unit, the discard rate unit configured to compute a packet discard rate.

28. The communications device of claim 26, wherein the processing unit comprises:

a dropped packet unit coupled to the discontinuity determining unit, the dropped packet unit configured to determine that a packet associated with the first discontinuity has been dropped if there is the first discontinuity in the first set of sequence numbers but there is not the corresponding first discontinuity in the second set of sequence numbers; and a dropped packet counter coupled to the dropped packet unit, the dropped packet counter configured to count the number of dropped packets.

29. The communications device of claim 28, wherein the dropped packet unit is further configured to determine that the packet associated with the first discontinuity has been lost in transmission if there is the first discontinuity in the first set of sequence numbers and if there is the corresponding first discontinuity in the second set of sequence numbers.

30. The communications device of claim 28, wherein the dropped packet unit is further configured to determine that a packet associated with the first discontinuity has been dropped further comprises determining that the packet was dropped in the first protocol layer by the transmitting station of the sequence of packets.

31. The communications device of claim 28, wherein the discontinuity determining unit determines if there is the first discontinuity in a first set of sequence numbers if there is a missing sequence number in the first set of sequence numbers for packets in the sequence of packets received within a time window.

32. The communications device of claim 28, wherein the discontinuity determining unit is further configured to determine if there is a second discontinuity in the second set of sequence numbers, and to determine if there is a corresponding second discontinuity in a third set of sequence numbers, wherein the third set of sequence numbers is associated with third protocol layer packets of the sequence of packets, wherein the third protocol layer packets belong to a lower protocol layer than the second protocol layer packets.

33. The communications device of claim 32, wherein the dropped packet unit is further configured to determine that a packet associated with the second discontinuity has been dropped if there is the second discontinuity in the second set of sequence numbers but there is not the corresponding second discontinuity in the third set of sequence numbers, and to determine that the packet associated with the second discontinuity has been lost in transmission if there is the second discontinuity in the second set of sequence numbers and if there is the corresponding second discontinuity in the third set of sequence numbers.

34. The communications device of claim 28, wherein the communications device comprises a relay node and the transmitting station comprises a donor enhanced NodeB.

* * * * *